(No Model.) 2 Sheets—Sheet 2.

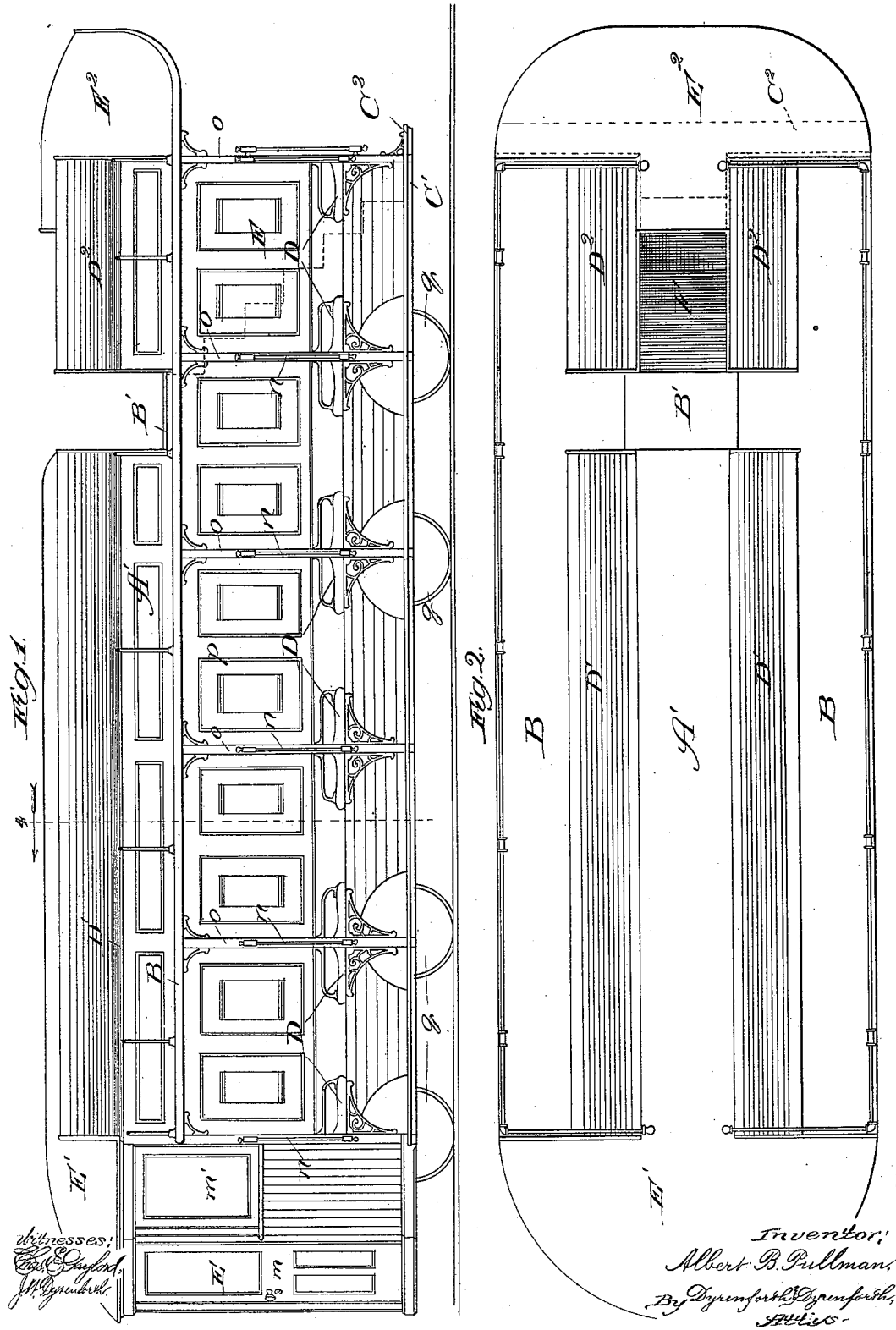

A. B. PULLMAN.
RAILWAY CAR.

No. 419,356. Patented Jan. 14, 1890.

Witnesses:
Chas. E. Gaylord,
J. W. Dyrenforth

Inventor:
Albert B. Pullman,
By Dyrenforth & Dyrenforth
Attys.

UNITED STATES PATENT OFFICE.

ALBERT B. PULLMAN, OF CHICAGO, ILLINOIS.

RAILWAY-CAR.

SPECIFICATION forming part of Letters Patent No. 419,356, dated January 14, 1890.

Application filed June 25, 1889. Serial No. 315,478. (No model.)

*To all whom it may concern:*

Be it known that I, ALBERT B. PULLMAN, a citizen of the United States, residing at Chicago, in the county of Cook and State of Illinois, have invented a new and useful Improvement in Railway-Cars, of which the following is a specification.

The object of my invention is to provide a novel construction of railway-car, whereby it shall have a sub-compartment adapted to house the propelling machinery, if the vehicle be a "motor-car," so called to distinguish it from a horse or cable car, or to receive freight and the like, and this without detracting from, but, on the contrary, rather improving, the appearance of the car, and without reducing its seating capacity below that of other cars of substantially the same dimensions.

My object is also to provide such a car with an elevated compartment or deck for passengers, accessible by stairs leading to it inside the car, and which shall afford to the passengers, owing to its elevation, observatory advantages, and may be used as a smoking-car and be opened or sealed, as desired.

Further objects are to utilize the space at opposite sides of the sub-compartment referred to for the accommodation of passengers by providing seats readily accessible from the sides of the car, and to afford a receptacle between the seats of the upper deck or compartment to contain water for use in generating the power for driving the car if it carry its own propelling mechanism, or for other storage purposes if it be used as a horse or other car not of the kind carrying mechanism for propelling it.

Figure 3:
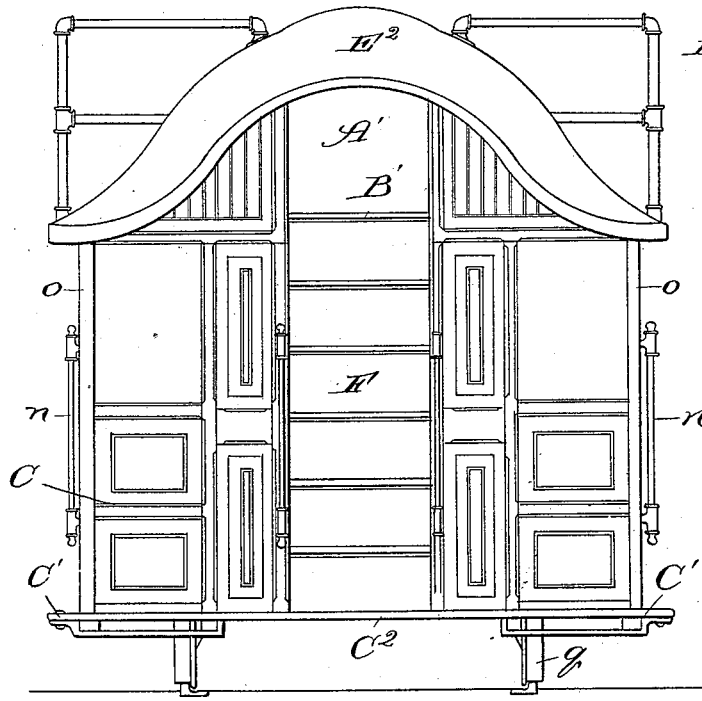

In the accompanying drawings, Figure 1 shows a street-railway car of my improved construction in side elevation and partly in perspective. Fig. 2 is a plan view of the car; Fig. 3, a view in rear end elevation, and Fig. 4 a section taken on the line 4 of Fig. 1 and viewed in the direction of the arrow.

My improvement is shown in the drawings as a street-railway car, and for convenience I confine the description hereinafter contained mainly to such a car, though I wish it to be clearly understood that I claim my invention applied to any kind of car to which it may be applicable.

Figure 4:
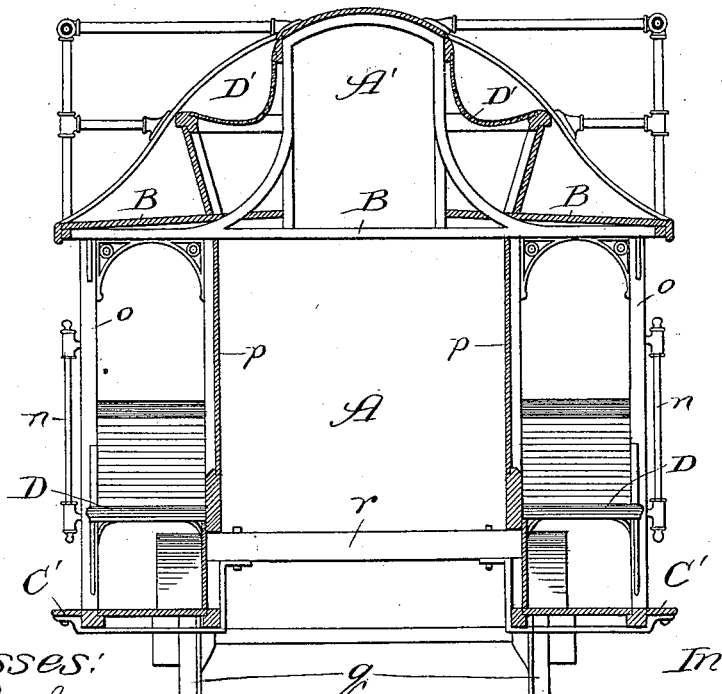

A, Fig. 4, is the lower storage-compartment, which should involve a width that will leave sufficient space at its opposite sides to accommodate seats, as hereinafter described. The base *r* of the compartment A is between the wheels *q*, or inside the space bounded by the wheels, and should be so low with reference to the ground that the superstructure, hereinafter described, may not be rendered by the provision of the lower compartment undesirably high or higher than in other cars of the kind, and the base *r* may be formed of frame-work, either covered or uncovered. From the base *r* extend the side walls *p* to the height desired for the compartment (say between three and four feet) and nearly the full length of the car, and the walls *p* are surmounted by a cover extending laterally beyond them and affording an upper deck B for passengers or the floor for an upper passenger-compartment. Floors C C extend laterally from the bases of the sides *p* of the storage-compartment A slightly short of the deck B, and below the floors C are the side steps C', extending from the side sills of the car-frame beyond the floors C C, and preferably about fourteen inches from the ground, being braced, as shown, from the base *r* and by vertical posts *o*, supporting the usual grip bars or handles *n* and extending between the deck B and steps C', the posts being placed such distance apart as will afford between each adjacent pair room for two opposing seats D and their occupants, which seats, as to the posts *o* between the extreme ones, are supported one at each side of a post, as shown.

At the front end of the car I provide a cab E, extending from the base *r* to the top of the car, and which should be covered by a hood E', and communicates from its rear side with the storage-compartment A, the forward end having a door *m* and window *m'* to afford a lookout for the driver, for whom the cab is intended, and for the lever mechanism from which to control the mechanism for propelling the car contained in the compartment A, if the car be of the kind carrying its own propelling mechanism.

Above the compartment A on the deck B, and extending longitudinally of the car from the cab E to within such distance of the rear end of the car as will afford space for the staircase and landing, hereinafter described, is a storage compartment or tank A', which I design particularly for containing water, and which is flanked on opposite sides by the lengthwise-extending seats D' and the deck B, which is open from beyond the rear end of the tank A' sufficiently far to afford a landing B' of suitable dimensions, is reached from the rear platform or step C² by a staircase F, wholly inside the car, extending to the landing B', the rear end of which should coincide with the corresponding end of the storage-compartment A, though the side walls $p$ of the latter reach to the rear step or platform and afford for the staircase a lateral inclosure, which, however, should be open through the deck B in rear of the landing B,' the opening being flanked on opposite sides by seats D². A hood E² should be provided at the rear end of the car.

If propelling machinery for moving the car be carried by it, the machinery will all be contained in the storage-compartment A, and will be controlled by the driver in the cab E, when the water contained in the reservoir A' will serve for generating the power for driving the machinery.

If the vehicle be used as a cable or horse car, as it may be, the compartments A and A' will serve for the storage and transportation of merchandise and the like, as, in fact, the compartment A may also even when containing the machinery.

As illustrated, the upper part of the car is shown to be open, being provided at its edges merely with guard-railing. Obviously, however, it may be inclosed with a proper top and sides to seal it and without rendering it undesirably high.

What I claim as new, and desire to secure by Letters Patent, is—

1. In a car, the combination of a base $r$, having a sub-compartment A upon it narrower than the car, seats D, supported at opposite sides of the said compartment and accessible from opposite sides of the car, a deck B over the seats D and affording the top of the compartment A, seats on the deck, and a stairway leading inside the compartment A to the deck, substantially as described.

2. In a car, the combination of a base $r$, having a sub-compartment A upon it narrower than the car, seats D, supported at opposite sides of the compartment, a deck B over the seats D and compartment A and open toward one end, a reservoir A' on the deck B flanked by seats D', a landing B' at one end of the reservoir, and a staircase F, leading inside the car from its lower part to the landing, substantially as described.

3. In a car, the combination of a base $r$, having a sub-compartment A upon it narrower than the car, floors C, extending from the sides of the compartment, and steps C', below the floors, seats D, supported above the floors C, a deck B over the said seats and compartment and open toward one end, a reservoir A' on the deck flanked by seats D', a landing B' at one end of the reservoir, a staircase F, leading inside the car from its lower part at one end to the landing, and seats D² on the deck at opposite sides of the staircase opening, substantially as described.

4. In a car, the combination of a base $r$, having a sub-compartment A, extending along it short of its opposite ends and having the sides of the compartment continue toward the rear end of the car, floors C, extending from the sides of the compartment, and steps C' below the floors, seats D, supported above the floors C, a deck B over the said seats and compartment and open at its rear end, a reservoir A' on the deck flanked by seats D', a landing B', a staircase F, leading between the extended sides of the compartment to the landing, and a cab E at the front end of the car, substantially as described.

ALBERT B. PULLMAN.

In presence of—
J. W. DYRENFORTH,
M. J. SMALL.